US 6,698,451 B2

(12) United States Patent
Anderson et al.

(10) Patent No.: US 6,698,451 B2
(45) Date of Patent: Mar. 2, 2004

(54) CONVEYING PIPELINE MOUNTED INSIDE A BOOM

(75) Inventors: Thomas M. Anderson, Dellwood, MN (US); Lawrence P. Schmidt, Lino Lakes, MN (US); David R. Bissen, Plymouth, MN (US); Brian E. Spencer, Lincoln, NE (US); Leo B. Willner, Santa Cruz, CA (US)

(73) Assignee: Schwing America, Inc., White Bear Lake, MN (US)

( * ) Notice: Subject to any disclaimer, the term of this patent is extended or adjusted under 35 U.S.C. 154(b) by 211 days.

(21) Appl. No.: 10/043,008

(22) Filed: Jan. 9, 2002

(65) Prior Publication Data

US 2002/0117219 A1 Aug. 29, 2002

Related U.S. Application Data

(60) Provisional application No. 60/278,798, filed on Mar. 26, 2001, provisional application No. 60/278,132, filed on Mar. 23, 2001, provisional application No. 60/271,095, filed on Feb. 23, 2001, and provisional application No. 60/271,094, filed on Feb. 23, 2001.

(51) Int. Cl.⁷ ............................................. F17D 1/08
(52) U.S. Cl. ....................................... 137/615; 141/387
(58) Field of Search ...................... 137/615; 141/387, 141/388

(56) References Cited

U.S. PATENT DOCUMENTS

| | | | | |
|---|---|---|---|---|
| 3,572,380 A | * | 3/1971 | Jackson et al. | 137/615 |
| 3,742,985 A | | 7/1973 | Rubenstein | 138/141 |
| 3,789,869 A | * | 2/1974 | Morris | 137/615 |
| 3,947,191 A | | 3/1976 | Milner, Jr. | 403/334 |
| 3,955,600 A | | 5/1976 | Tamburello | 138/141 |
| 3,958,377 A | | 5/1976 | Milner, Jr. | 52/118 |
| 3,964,512 A | | 6/1976 | Dumas | 137/615 |
| 4,037,626 A | | 7/1977 | Roberts, Jr. | 138/109 |
| 4,047,354 A | | 9/1977 | Sutherland | 52/729 |
| 4,070,021 A | | 1/1978 | Cecka et al. | 273/73 F |
| 4,212,461 A | | 7/1980 | Cecka et al. | 273/73 F |
| 4,290,836 A | | 9/1981 | McPherson et al. | 156/171 |

(List continued on next page.)

OTHER PUBLICATIONS

Jim Moriarty, London Underground Ltd., Frazer Barnes, Devonport Royal Dockyard Ltd., *The Use of Carbon Fiber Composites in the London Underground Limited Civil Infrastructure Rehabilitation Program*, SAMPE Journal, Mar./Apr. 1998, vol. 34, No. 2.

Schwing America, Inc. sales brochure, "Technology of truck–mounted concrete pumps with placing booms."

Schwing America, Inc. sales brochure, "KVM 28, KVM 32, DVM 32, DVM 42 Separate Placing Booms", Feb. 1999, 4 pages.

"Frequent Flyer Program For Concrete Booms", Concrete Construction Magazine, 4 pages, published prior to Feb. 21, 2001.

"KVM 28/28X Load Chart Wall Supported", Schwing America, Inc., Marketing drawing, 1 page, distributed prior to Feb. 21, 2001.

"Putzmeister America MXR32 Placing Boom Standard Layout", Putzmeister America Marketing drawing, 4 pages, received prior to Feb. 21, 2001.

Schwing America, Inc. sales brochure, "Separate Placing Booms and Their Fields of Application," published prior to Feb. 21, 2001.

*Primary Examiner*—Kevin Lee
(74) *Attorney, Agent, or Firm*—Kinney & Lange, P.A.

(57) ABSTRACT

The invention is a placing boom comprising a plurality of boom sections connected together in an articulated arrangement. A pipeline is carried by the boom sections, wherein the pipeline is disposed inside at least one of the boom sections.

28 Claims, 8 Drawing Sheets

U.S. PATENT DOCUMENTS

| | | | |
|---|---|---|---|
| 4,357,962 A | 11/1982 | Shaw | 138/125 |
| 4,410,013 A | 10/1983 | Sasaki et al. | 138/149 |
| 4,412,882 A | 11/1983 | Morimoto et al. | 156/188 |
| 4,450,873 A | 5/1984 | Sadler et al. | 138/174 |
| 4,515,737 A | 5/1985 | Karino et al. | 264/22 |
| 4,515,861 A | 5/1985 | Arup | 428/450 |
| 4,518,556 A | 5/1985 | Yamamoto et al. | 264/295 |
| 4,553,899 A | 11/1985 | Magni | 414/629 |
| 4,729,541 A | 3/1988 | Maier | 249/18 |
| 4,768,917 A * | 9/1988 | Garman | 414/697 |
| 4,845,867 A | 7/1989 | Albrecht | 37/117.5 |
| 4,874,661 A | 10/1989 | Browne et al. | 428/246 |
| 4,888,247 A | 12/1989 | Zweben et al. | 428/105 |
| 4,907,624 A | 3/1990 | Jonasson | 138/125 |
| 4,924,898 A * | 5/1990 | Evenson | 137/615 |
| 5,035,850 A | 7/1991 | Yoshikawa et al. | 264/256 |
| 5,048,441 A | 9/1991 | Quigley | 114/90 |
| 5,097,585 A | 3/1992 | Klemm | 29/523 |
| 5,106,443 A | 4/1992 | Burba et al. | 156/175 |
| 5,127,272 A | 7/1992 | Dean et al. | 73/861.04 |
| 5,130,165 A | 7/1992 | Shao et al. | 427/330 |
| 5,144,710 A | 9/1992 | Grossman | 14/73 |
| 5,183,316 A | 2/1993 | Ottestad | 299/69 |
| 5,188,872 A | 2/1993 | Quigley | 428/36.2 |
| 5,222,769 A | 6/1993 | Kaempen | 285/45 |
| 5,238,716 A * | 8/1993 | Adachi | 428/34.7 |
| 5,251,420 A | 10/1993 | Johnson | 52/664 |
| 5,334,429 A | 8/1994 | Imoto et al. | 428/36.2 |
| 5,403,537 A | 4/1995 | Seal et al. | 264/511 |
| 5,411,060 A | 5/1995 | Chandler | 138/98 |
| 5,426,907 A | 6/1995 | Franklin | 52/749 |
| 5,553,439 A | 9/1996 | Grossman | 52/745.2 |
| 5,573,348 A | 11/1996 | Morgan | 405/52 |
| 5,575,526 A | 11/1996 | Wycech | 296/205 |
| 5,580,626 A | 12/1996 | Quigley et al. | 428/36.2 |
| 5,617,692 A | 4/1997 | Johnson et al. | 52/651.02 |
| 5,624,519 A | 4/1997 | Nelson et al. | 156/245 |
| 5,672,227 A | 9/1997 | Chiu | 156/295 |
| 5,722,589 A | 3/1998 | Richards | 238/84 |
| 5,944,441 A | 8/1999 | Schütze | 403/403 |
| 6,142,180 A | 11/2000 | Woodling et al. | 137/615 |

\* cited by examiner

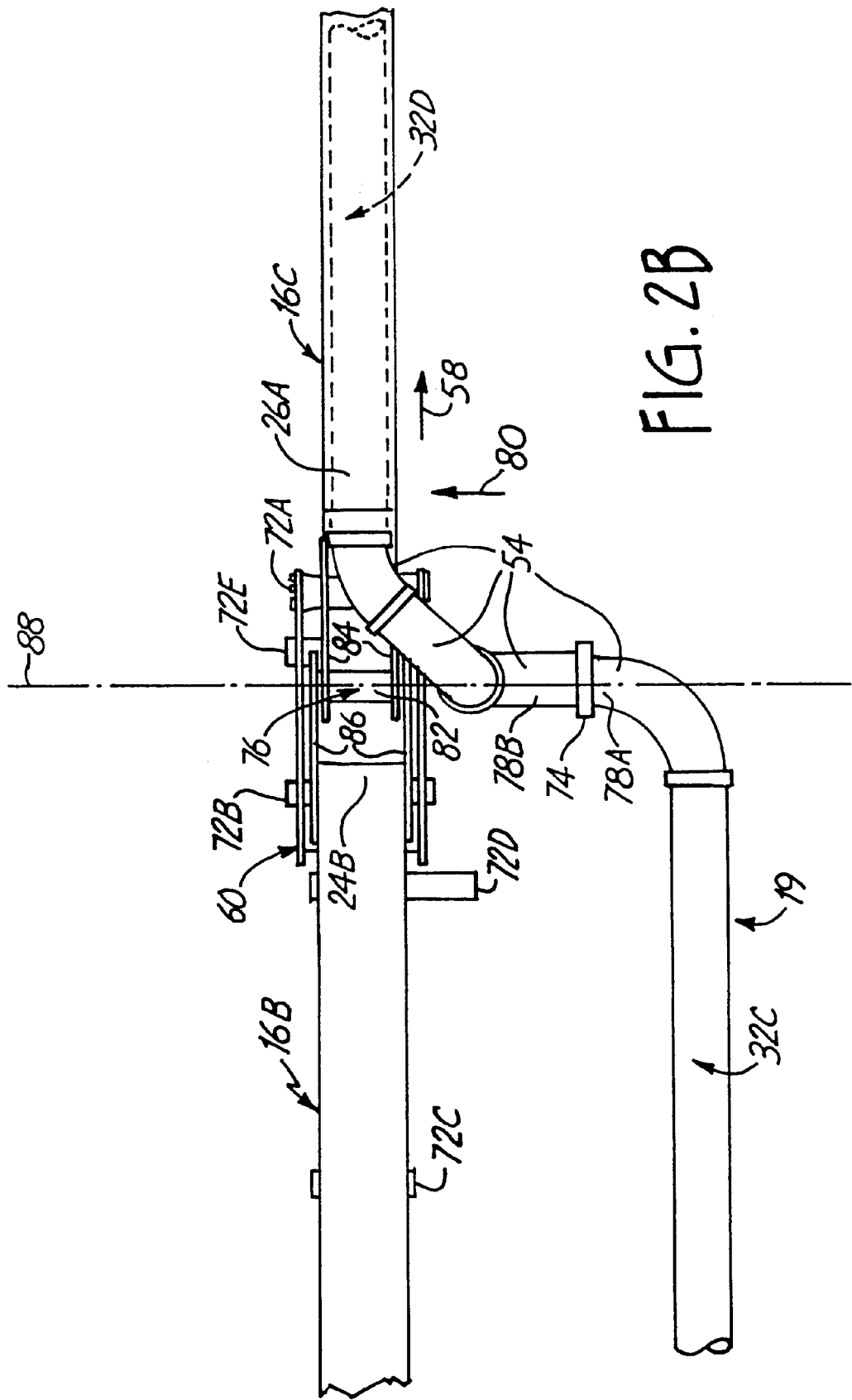

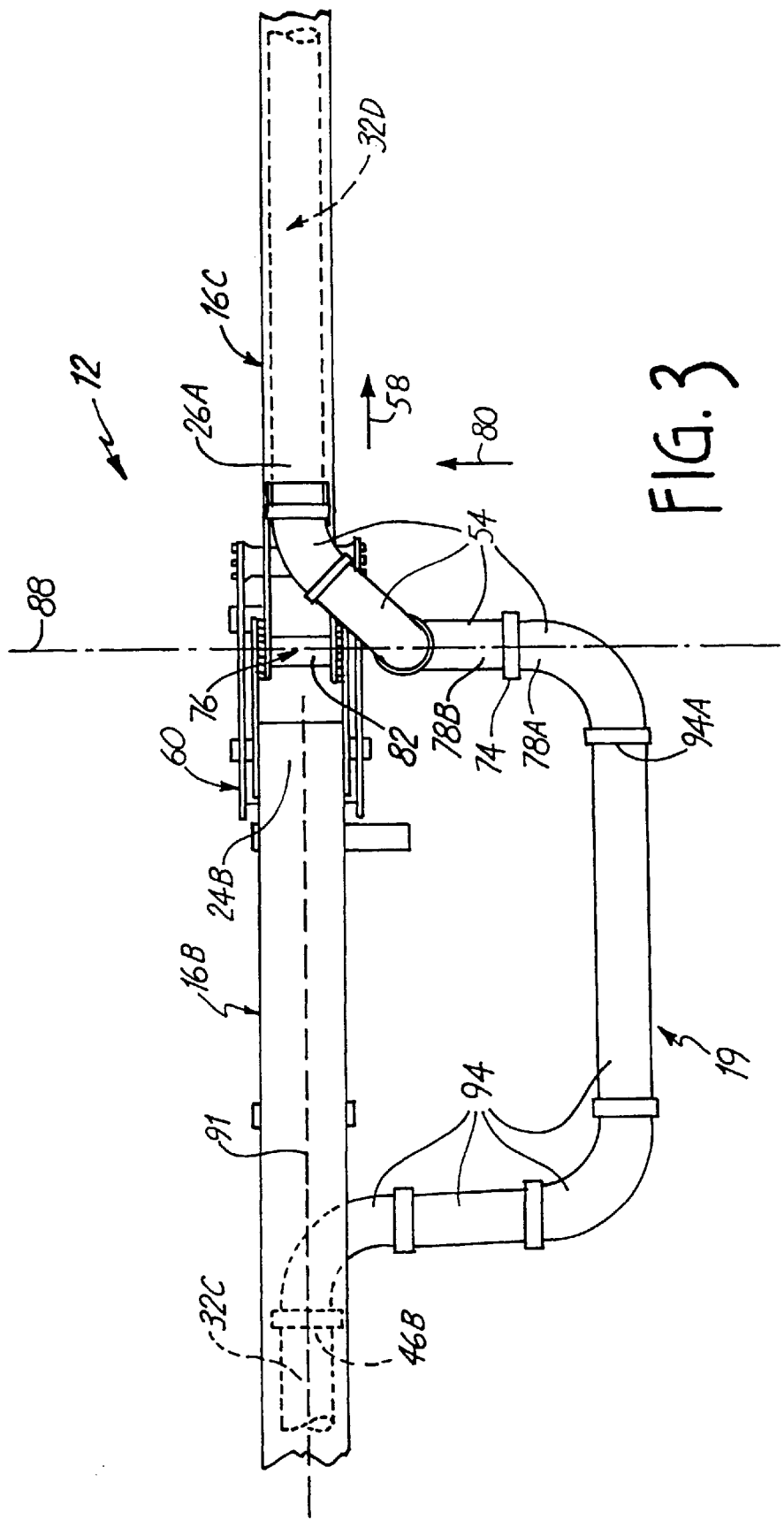

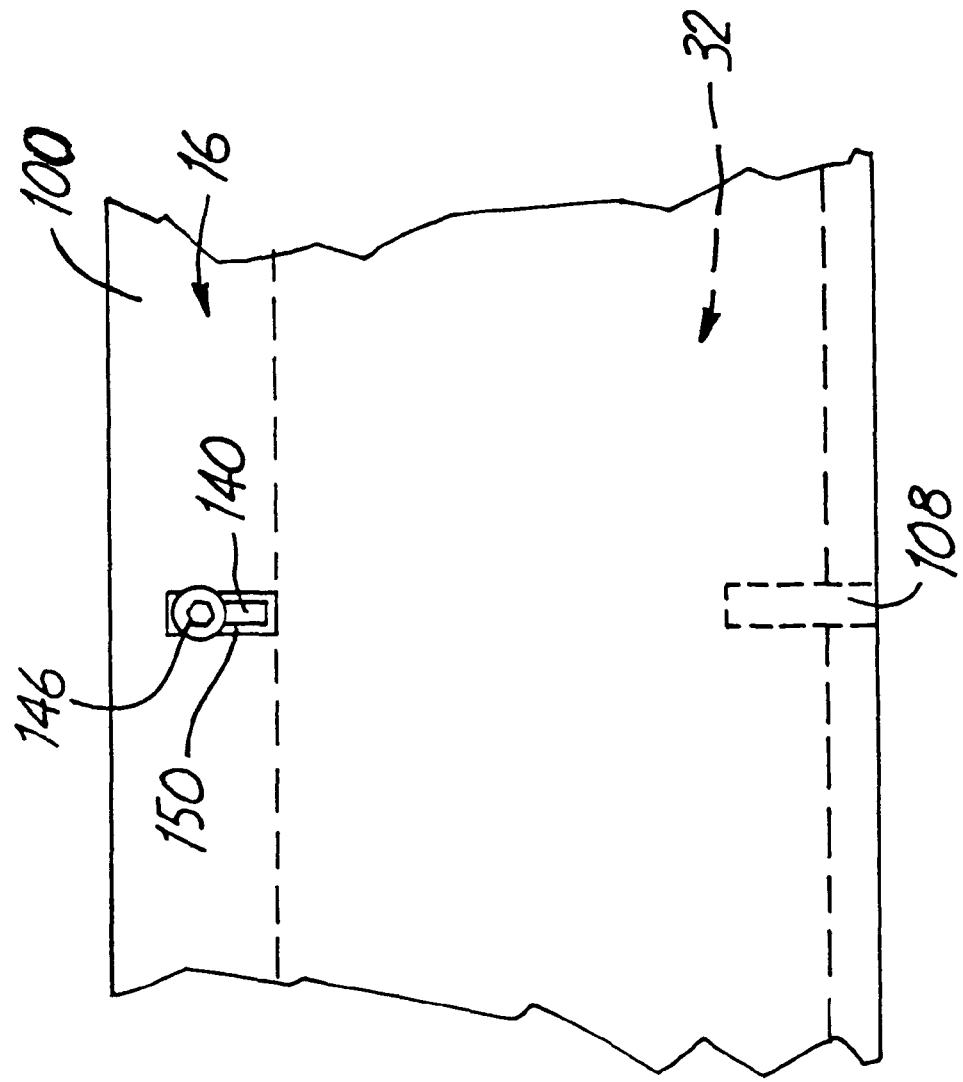

CONVEYING PIPELINE MOUNTED INSIDE A BOOM

CROSS-REFERENCE TO RELATED APPLICATIONS

This application claims the benefit of Provisional Application Nos. 60/271,095 filed Feb. 23, 2001 for "Conveying Pipeline Mounted Inside A Boom" by T. Anderson, L. Schmidt, D. Bissen, B. Spencer and L. Willner; 60/271,094 filed Feb. 23, 2001 for "Boom Stiffening System" by T. Anderson, L. Schmidt, D. Bissen, B. Spencer, R. Grover and L. Willner; 60/278,798 filed Mar. 26, 2001 for "Composite Material Piping System" by D. Bissen, L. Schmidt, B. Spencer and L. Willner; 60/278,132 filed Mar. 23, 2001 for "Boom Utilizing Composite Material Construction" by T. Anderson, D. Bissen, L. Schmidt, R. Atherton, B. Spencer, L. Willner and R. Grover, all of which are incorporated by reference herein.

BACKGROUND OF THE INVENTION

The present invention relates to a conveying boom system. In particular, the present invention relates to a system for supporting a conveying pipe system on the interior of a boom section.

Boom systems offer a safe, cost effective and efficient method of lifting a load and placing it in a distanced elevated position. Boom systems can be mounted on portable platforms such as trucks. Truck mounted boom systems are used as portable lifting and moving mechanisms, as well as to support piping for pumping liquids or semi-liquids. These boom systems typically have more than one boom section which makes up the overall boom system. Each boom section has a corresponding actuator assembly which moves the boom section (for example by articulating or telescoping the section).

Booms are commonly used in hazardous environments and must be articulated with precision to allow proper positioning of the boom. Boom systems known in prior art commonly support a conveying pipeline by attaching brackets to the exterior of the boom sections. The pipelines are used to direct liquids or semi-liquids, such as water or concrete. During positioning of the boom, inadvertent contact with external objects can occur. If contact occurs, it may result in undesirable damage to the boom and its exposed conveying pipeline. Using an externally mounted pipeline also causes clearance problems which occur when the boom is folded and deployed. The boom sections must be articulated in such a manner that the various sections of the pipeline do not contact each other (or the boom sections) during folding and deployment operation. Again, contact of the pipeline with the boom sections can result in damage to the externally attached pipeline.

While it is important to protect the conveying pipeline attached to the boom system, it is equally important that each boom section has as little weight as is reasonably possible. The weight of a boom at an outer section must be supported by the lower boom sections. Since each boom acts as a cantilever, the greater the weight of the boom and the load supported by the boom, the greater the moment generated by the boom with respect to the support system. If the boom is extended horizontally, the weight of the boom is moved farther away from the center of the gravity of the boom and support system, creating a large moment about the support system (i.e. the truck). The large moment causes an increased likelihood that the boom and support system may enter an unstable condition and tip over.

Mounting the pipeline externally along the boom sections introduces fatigue problems to the pipe support system. The eccentric loading of the boom sections can produce stresses at the connection point between the pipe supports and the pipeline. Additionally, when the liquid or semi-liquid is pumped through the pipeline, the pumping action can cause transverse and longitudinal forces to be imposed on the attached boom section. These forces are typically cyclical (particularly when a piston pump is being used as the pumping means) causing fatigue of the pipe supports due to the stresses induced by the eccentric loading. When piston type pumps are being used, a line shock occurs with each stroke of the piston. The force of the line shock causes the fluid to push longitudinally against the boom, thereby producing a force parallel but eccentric to the longitudinal axis of the boom. Again, this can fatigue the pipeline brackets, causing them to weaken and break so that the pipeline becomes unattached from the boom. To overcome problems with the strength of the support, the brackets necessarily must be larger, adding weight to the boom system and decreasing stability of the boom system at the boom support. Thus, there is a need in the art for a system for protecting conveying pipeline from damage caused by contact of a boom section with an external object and for mounting the pipeline along the axis of the boom sections, without significantly increasing the weight of the boom.

BRIEF SUMMARY OF THE INVENTION

The invention is a placing boom comprising a plurality of boom sections connected together in an articulated arrangement. A pipeline is carried by the boom sections, wherein the pipeline is disposed inside at least one of the boom sections.

BRIEF DESCRIPTION OF THE DRAWINGS

FIG. 2B is a partial top view of the boom system shown in FIG. 1.

FIG. 3 is an alternate embodiment of the boom system shown in FIG. 2B.

FIG. 5A is a partial side view of the embodiment shown in FIG. 5.

DETAILED DESCRIPTION

Figure 1:
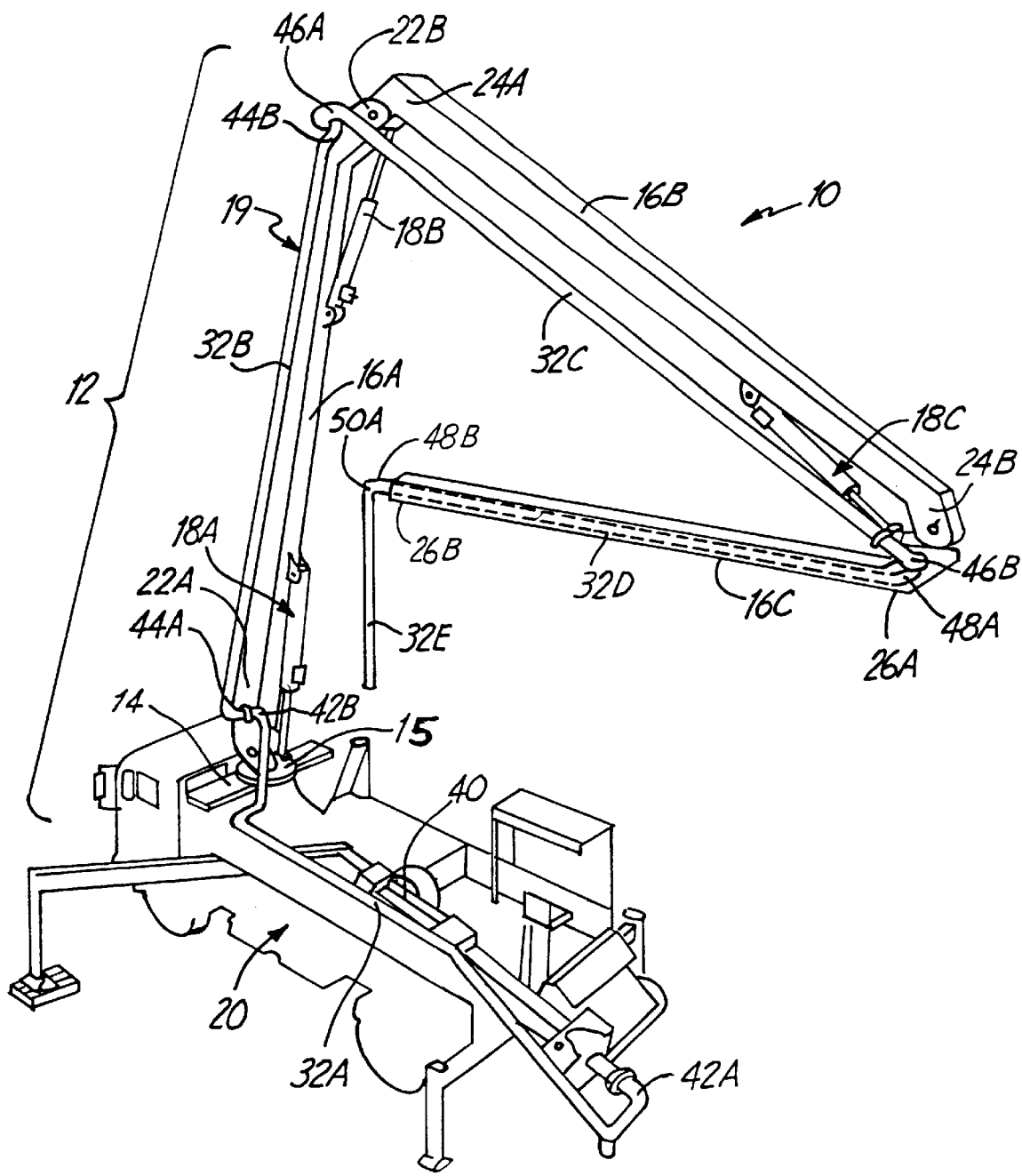
FIG. 1 is a perspective view of a boom system mounted on a truck.

FIG. 1 shows a perspective view of truck mounted boom system 10, including boom system 12. The boom system 12 is mounted to a boom support of base 14 and includes a turret 15, a base boom section 16A, a middle boom section 16B, an end boom section 16C, a first actuator assembly 18A, a second actuator assembly 18B, and a third actuator assembly 18C. A pipeline 19 is attached to the boom system 12.

The base 14 of the boom system 12 is mounted on a truck 20 to support the turret 15 and the boom sections 16A, 16B, and 16C. Mounting the boom system 12 on the truck 20 provides a mobile platform for the boom system 12. The boom system 12 can be mounted to a variety of mobile platforms, including a ship, or a train or alternatively a variety of non-mobile ground mounted support systems. A proximal end 22A of the base boom section 16A is pivotally connected to the turret 15. A distal end 22B of the base boom section 16A is pivotally connected to a proximal end 24A of the middle boom section 16B. Likewise, a distal end 24B of the middle boom section 16B is pivotally connected to a proximal end 26A of the end boom section 16C. The distal end 26B of the end boom section 16C is unfixed. Although in the embodiment shown in FIG. 1 the boom system 12 has three boom sections 16A, 16B and 16C, in other embodiments the boom system 12 can include any number of boom sections. Additionally, please note that in the following description of FIGS. 1–5A, specific examples of elements of the boom system such as "base boom section 16A" are referred to with a reference number that includes an appended letter, in this case the letter "A." On the other hand, when the elements are referred to generally, no letter is appended (e.g. "boom section 16") which refers generally to all of the boom sections in the inventive embodiment.

The first actuator assembly 18A is connected between the turret 15 and the base boom section 16A for moving the base boom section 16A relative to the turret 15. The second actuator assembly 18B is connected between the base boom section 16A and the middle boom section 16B and is used to move the middle boom section 16B relative to the base boom section 16A. The third actuator assembly 18C is connected between the middle boom section 16B and the end boom section 16C and is used to move the end boom section 16C relative to the middle boom section 16B.

In the illustrated embodiment, the boom system 12 is hydraulically actuated and the actuator assemblies 18A, 18B, and 18C are hydraulic pistons/cylinder assemblies. It should be noted, however, that the actuator assemblies 18A, 18B and 18C can be any other type of actuator assembly capable of producing mechanical energy to rotate the boom sections 16A, 16B and 16C with respect to each other. The actuator assemblies 18A, 18B, and 18C can be a type of hydraulic actuator other than a piston/cylinder assembly. For example, 18A, 18B, and 18C can be pneumonic, electrical, or any other type of actuator known to a person skilled in the art. The actuators 18A, 18B, and 18C are controlled by the operator to direct the distal end 26B of the end section 16C in the desired position. Typically, the turret 15 (and thus the entire boom system 10) can be rotated with respect to the base 14 about a vertical axis.

The pipeline 19 is secured to the boom system 12 as well as the truck 20. The pipeline 19 includes a feed pipe section 32A, a first pipe section 32B, a second pipe section 32C, a third pipe section 32D, and a placement hose (or placement pipe) section 32E. The pipeline 19 is used to direct material (e.g. concrete) forced though the pipeline 19 by a piston pump 40 (although other types of pumps are contemplated by the invention). Thus, the operator can position the distal end 26B of the end boom section 16C (and the placement hose 32E) so as to direct concrete pumped through the pipeline 19. A typical use of the piping system 19 is to pump concrete into concrete forms at construction sites.

A proximal end 42A of the feed pipe section 32A is connected to the output of the pump 40, and extends to the turret 15 where a distal end 42B of the feed pipe section 32A is pivotally connected to a proximal end 44A of the first pipe section 32B. The first pipe section 32B is attached to the base boom section 16A. Typically, the first pipe section 32B is mounted using brackets to the outside of the base boom section 16A, as is known in the art, and extends substantially parallel to the longitudinal axis of the base boom section 16A. A distal end 44B of the first pipe section 32B is pivotally connected to the proximal end 46A of the second pipe section 32C. The second pipe section 32C is mounted using brackets as known in the art, to the outside of the middle boom section 16B and extends substantially parallel to the longitudinal axis of the middle boom section 16B. A distal end 46B of the second pipe section 32C is pivotally connected to a proximal end 48A of the third pipe section 32D.

The third pipe section 32D is mounted inside the end boom section 16C (as indicated by dashed lines). Mounting the third pipe section 32D in this manner prevents the pipe from being damaged by external objects when the boom system 12 is rotated and articulated. The third pipe section 32D extends substantially along the longitudinal axis of the end boom section 16C, which acts to stiffen and strengthen the end boom section 16C without adding eccentric load to the end boom section 16C.

A distal end 48B of the third pipe section 32D extends out of the distal end 26B of the third boom section 16C and is pivotally connected to a proximal end 50A of the placement hose 32E. Typically, the placement hose 32E is not mounted to a support structure. Instead, it is allowed to pivot freely from the third pipe section 32D, and typically will pivot so that a distal end of the placement hose 32E points downward. While this is the typical connection between the placement hose 32E and the third pipe section 32D, other connections are known in the art and do not depart from the spirit and scope of the invention. Typically, the entire pipeline 19 excluding the placement hose 32E is steel. The placement hose 32E is typically rubber. It should be noted, however, that other piping materials may be used for all or part of the pipeline 19, including rubber hose, composite materials, or other non-steel pipe.

Figure 2A:
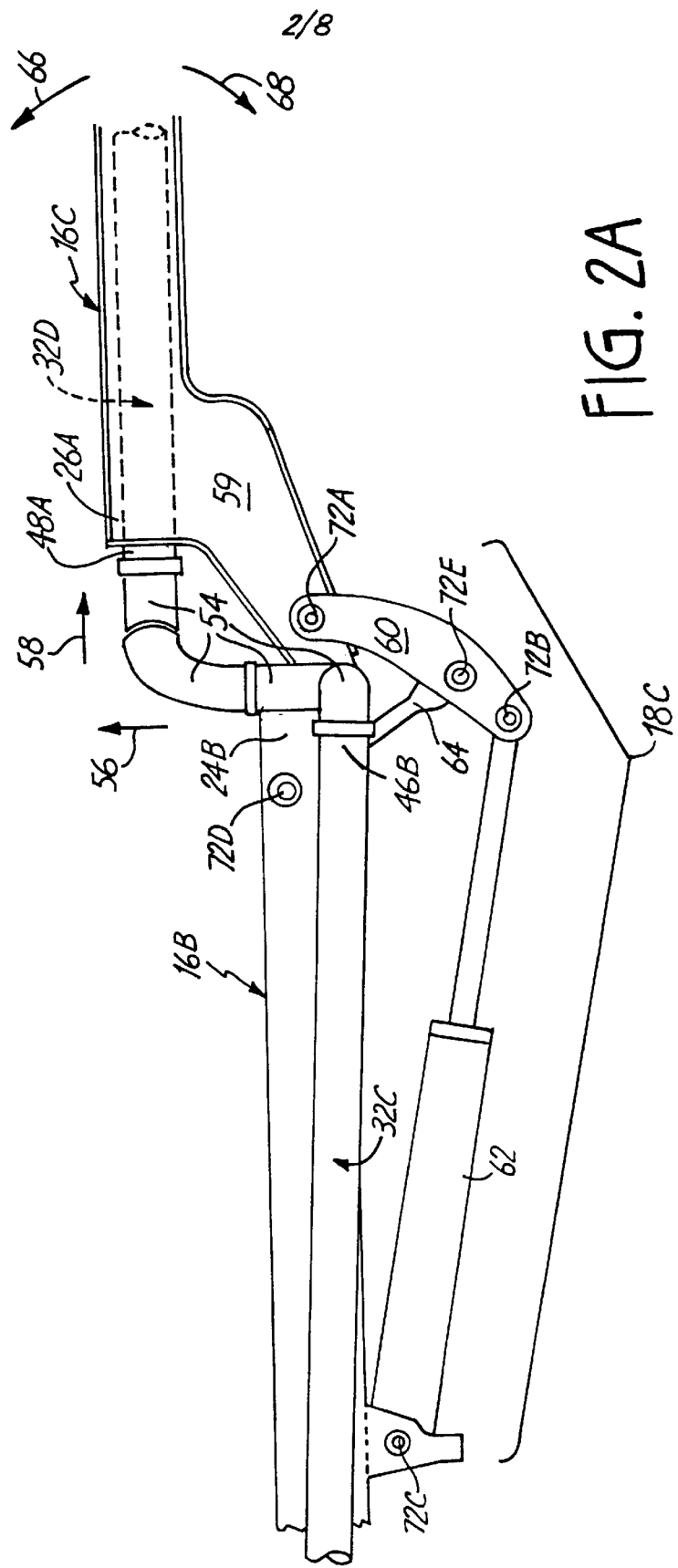
FIG. 2A is a partial side view of the boom system shown in FIG. 1.

FIG. 2A shows a partial elevational view of the joint connection of the distal end 24B of the middle boom section 16B to the proximal end 26A of the end boom section 16C. The distal end 46B of the second pipe section 32C is connected to the proximal end 48A of the third pipe section 32D via transitional piping 54. The transitional piping 54 extends inwardly (with respect to the page) or transversely (with respect to the middle boom section 16B) from the second pipe section 32C, then upwardly as shown by arrow 56, and to the right, as shown by arrow 58. Thus, the transitional piping 54 is disposed to allow liquid to be pumped from the second pipe section 32C attached to the outside of the middle boom section 16B, to the third pipe section 32D disposed inside the end boom section 16C.

A foot section 59, typically integral to the end boom section 16C, is rotatably coupled to the middle boom section 16B as known in the art. The third actuator assembly 18C includes a positioning arm 60, a hydraulic piston 62, and a support strut 64. The positioning arm 60 is rotatably coupled to the end boom section 16C at pin 72A and rotatably coupled to the hydraulic piston at pin 72B. The hydraulic piston 62 is rotatably coupled to the middle boom section 16B at pin 72C. The support strut 64 is rotatably coupled between the middle boom section 16B and the positioning arm 60 at pins 72D and 72E, respectively. This configuration is known in the art. Extending the hydraulic piston 62 rotates the end boom section 16C counterclockwise relative to the middle boom section 16B as indicated by arrow 66. Retracting the hydraulic piston 62 rotates the end boom section 16C clockwise relative to the middle boom section 16B as indicated by arrow 68.

The pipe sections 32 and the boom sections 16 are able to rotate relative to each other due to a pipe coupling 74 and a pinned joint 76 as best shown in FIG. 2B. FIG. 2B shows a partial top view of the joint connection between the middle boom section 16B and the end boom section 16C. The pipe coupling 74 allows for the rotation of a first pipe end 78A with respect to a second pipe end 78B. A person skilled in the art would realize that any pipe coupling may be used which allows the first pipe end 78A to rotate with respect to the second pipe end 78B while still allowing passage of the piped material (e.g., concrete). In this view the transitional piping 54 directs the material transversely (arrow 80), upwardly (out of the page) and to the right (arrow 58) to join with the third pipe section 32D. The third pipe section 32D is disposed inside the end boom section 16C.

The pinned joint 76 includes a pin 82, two end boom flanges 84 extending from the proximal end 26A of the end boom 16C, and two middle boom flanges 86 extending from the distal end 24B of the middle of boom 16B. The pin 82 extends through the middle boom flanges 86 and the end boom flanges 84 transverse to the longitudinal axes of the middle and end boom sections 16B and 16C. Thus, the pin 82 defines an axis of rotation 88 around which the proximal end 26A of the end boom section 16C pivots with respect to the distal end 24B of the middle boom section 16B. The pipe coupling 74 also lies along the axis of rotation 88, so that the articulation of the boom sections 16 does not cause bending or breakage of the rigid pipeline 19. Therefore, the transitional piping 54 contains the pipe coupling 74 along the section that runs transversely (arrow 80). The coupling 74 is disposed so that the axis of rotation 88 defined by the pin 82 runs through the center of the coupling 74.

Although the inventive boom system configuration has been described with respect to three boom sections 16 it would be understood by a person skilled in the art that additional boom sections 16 can be added to the boom system 12 without departing from the scope of the invention. Additionally, the pipeline 19 can be run internally through any of the boom sections 16 using the configuration described with respect to FIGS. 2A and 2B, it may be desirable to run the pipeline internally through the first or second boom sections (16A or 16B) or alternatively through fourth or fifth boom sections (not shown).

Additionally, the pipeline 19 may be run internally through multiple boom sections 16. An alternate embodiment of the inventive boom system 12 is shown in FIG. 3 illustrating how the pipeline 19 is run through multiple boom sections 16 while still placing the coupling 74 along the axis of rotation 88. To accomplish the placement of the pipeline 19 in this fashion, the second pipe section 32C is run internally through the middle boom section 16B substantially along a longitudinal axis 91 of the middle boom section 16B. The second pipe section 32C does not extend completely to the distal end 24B of the middle boom section 16B. Instead, it is directed transversely outward from the longitudinal axis 91 of the middle boom section 16B and positioned so as to allow the connection of the distal end 46B of the second pipe section 32C to connecting piping 94. The connecting piping 94 extends transversely through the second boom section 16B, so as to be disposed outside the boom section 16B. The connecting piping 94 then extends parallel to the longitudinal axis 91 of the second boom section 16B to the transitional piping 54. The connecting piping 94 is coupled at 94A to the transitional piping 54. Extending the connecting piping 94 out of the middle boom section 16B in this manner disposes the rigid piping 19 along the axis of rotation 88 between the middle and end boom sections 16B and 16C. The rotatable pipe coupling couples the first pipe end 78A to the second pipe end 78B and the piping 19 is directed into the end boom section 16C as described previously. Again, the configuration described with respect to FIG. 3 is representative, and a person skilled in the art would realize that this configuration of piping 19 can be used between any of the boom sections 16 making up the boom system 12 (for example, between the base boom section 16A and the middle boom section 16B), as well as used in a boom system including any number of boom sections 16. Alternatively, other piping configurations which transition the piping 19 out of the middle boom section 16B, through the axis of rotation 88 and into the end boom section 16C may be used without departing from the spirit and scope of the invention.

Figure 4:
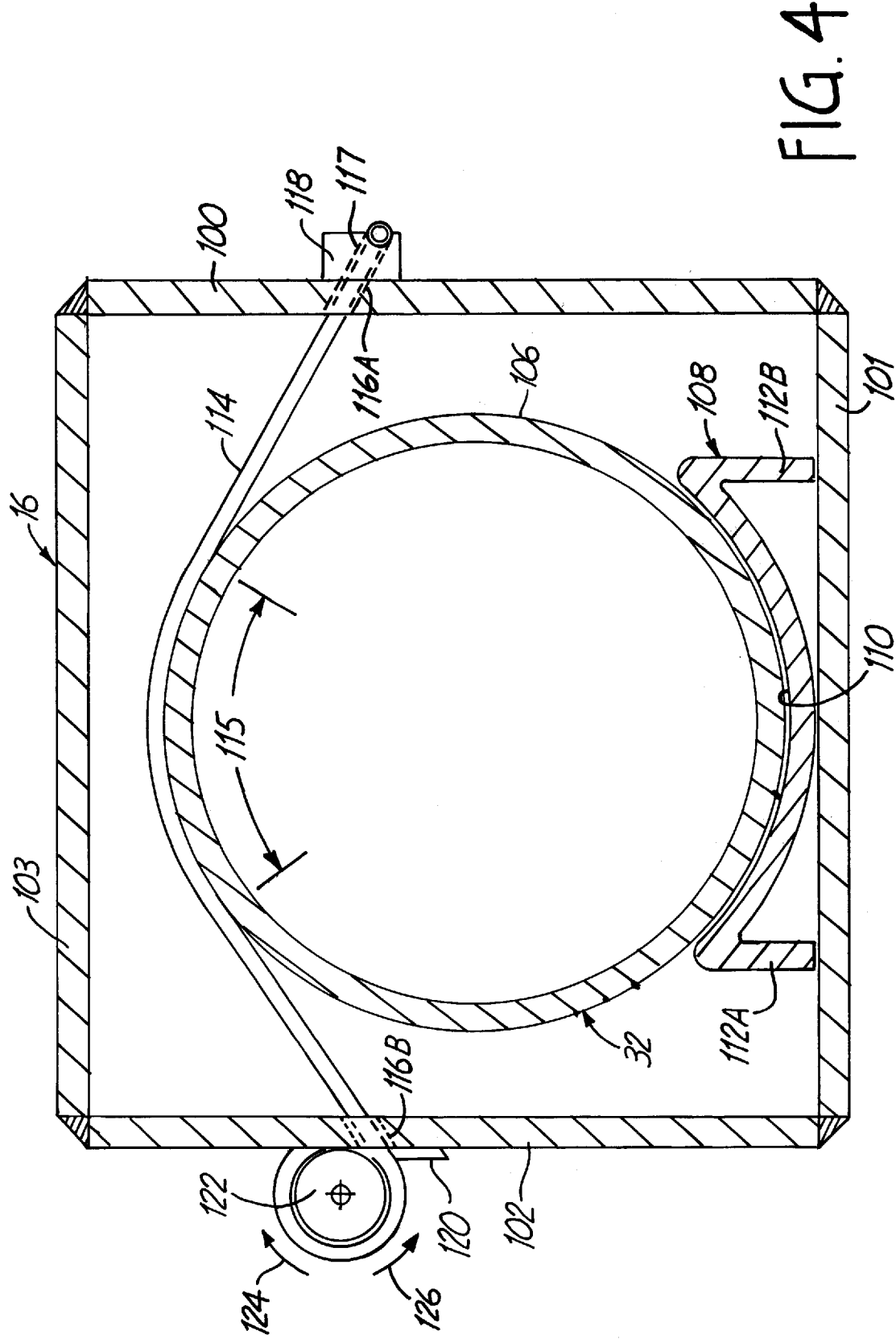
FIG. 4 is a cross sectional view of a boom section having an internally mounted pipe section.

FIG. 4 shows a cross-section of boom section 16. In this view, the pipe section 32 is disposed inside the boom section 16. Although in the embodiment described with respect to FIGS. 1–2B the pipe would only be disposed inside the boom system in the end boom section 16C, in alternate embodiments (such as shown in FIG. 3) this pipe mounting system can be utilized inside any of the boom sections included in the boom system. Typically, the boom section 16 is comprised of a first, second, third, and fourth steel plate 100–103, fillet welded together so that the cross-section of the boom section 16 is substantially rectangular. Other cross-sectional shapes (such as circular, elliptical and hexagonal) and other materials (such as aluminum or composites) may be used for the boom section 16 as long as it is able to internally accommodate the pipe section 32. As is best exemplified using a boom section having a circular cross-section (not shown), the piping inserted may alternatively be referred to as a "liner", and be in contiguous engagement with an inner surface of the boom section 16.

The pipe section 32 typically has a substantially circular cross-section. One method of mounting the pipe section 32 into the boom section 16 is to dispose an external wall 106 of the pipe section into a support bracket 108 (typically steel) inside the boom section 16. The support bracket 108 includes an annular top face 110 having a radius of curvature substantially similar to the radius of curvature of the external wall 106 so that the support bracket 108 contiguously engages a portion of the external wall 106. Two side flanges 112A and 112B are secured to the second steel plate 101, securing the bracket 108 in place. The annular top face 110 provides a support for the pipe section 32, stabilizing it from moving transversely inside the boom section 16. Although only one bracket 108 is shown in FIG. 4, multiple brackets may be used to provide support to the pipe section 32. For example, brackets can be mounted on each of the steel plates 100–103 to hold the pipe 32 in place. Alternatively, the bracket 108 may be made of molded composite materials.

A strap 114 extends through an aperture 116A in the first plate 100, and contiguously engages the pipe section 32 along an arc 115 of the external wall 106 of the pipe 32 and then extends through an aperture 116B in the third plate 102. A first end 117 of the strap 114 is fixedly secured to a mounting block 118 on the first plate, typically by pinning the strap 114 to the block 118, although other mounting methods are known in the art (welding, tying, etc.). A second end 120 of the strap 114 is wrapped around a roller 122 mounted to the third plate 102. The roller 122 is free to rotate in a first direction (arrow 124), and is prevented from rotating in a second opposite direction (arrow 126), for example by a cam or ratchet system (not shown). The second end 120 of the strap 114 is disposed around the roller 122 so as to be disposed between the roller 122 and the third steel plate 102. By disposing the roller 122 proximate to the plate 102, the strap 114 is frictionally engaged by the roller 122 and the plate 102. Rotating the roller in the first direction pulls on the strap 114 and forces the pipe section 32 transversely with respect to the boom section 16 onto the bracket 108. The strap 114 is maintained on the roller 122 due to the frictional engagement between the roller 122 and the third plate 102. To release the tension on the system, the roller 122 is released (for example by releasing the camming system) and the roller is rotated in the second direction 126. Adding tension to the strap maintains the pipe section 32 in engagement with the top face 110 of the bracket 108. Multiple straps 114 and brackets 108 can be placed longitudinally along the boom section 16 to maintain the position of the pipe section 32 along the length of the boom section 16. The strap 114 can be manufactured from a variety of materials including nylon and wire rope.

Figure 4B:
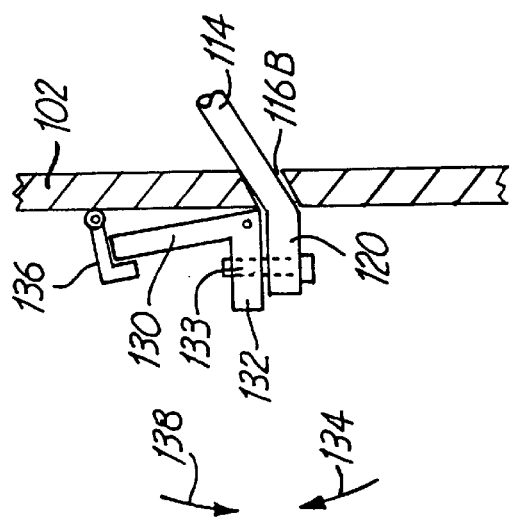
FIG. 4B is a partial cross-sectional view showing an alternate embodiment of the strap securing assembly.
Figure 4A:
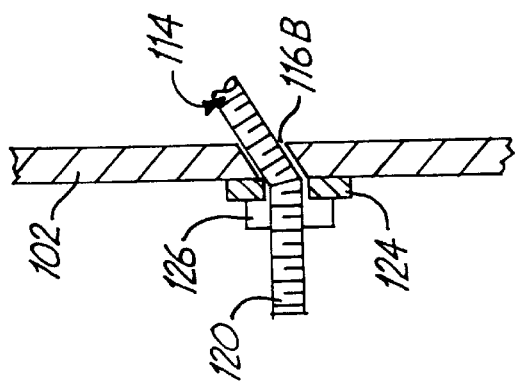
FIG. 4A is a partial cross-sectional view showing an alternate embodiment of the strap securing assembly.

An alternate method of applying and releasing tension to the strap 114 is shown in FIG. 4A. A bushing 124 is mounted (i.e. by welding) on the external side of the third plate 102 circumscribing the aperture 116B. The strap 114 is a wire rope and the second end 120 (which extends through the aperture 116B) is threaded. A nut 126 is threadably engaged with the second end 120 of the strap 114. Increasing the tension of the strap 114 is accomplished by rotating the nut 126 in one direction. To release the tension of the strap 114, the nut 126 is rotated in the opposite direction. The bushing 124 prevents wearing of the aperture 116B by the rotation of the nut 126.

Another alternate method for applying and releasing tension to the strap 114 is shown in FIG. 4B. An L shaped member 130 is pivotally mounted to the steel plate 102. The strap 114 is fixed to a first leg 132 of the L shaped member 130 for example, by a pin 133. Rotating the member 130 in the direction shown by arrow 134 pulls the attached second end 120 of the strap taught. The member 130 is secured in place by a latch 136, maintaining the tension on the strap 114. Releasing the latch 136 is accomplished by first pivoting the member 130 in the direction of arrow 134 and then pivoting the latch 136 out of the way (again, in the direction of arrow 134). The member 130 is then allowed to pivot in the direction of arrow 138 to provide slack to the strap 114.

Figure 5:
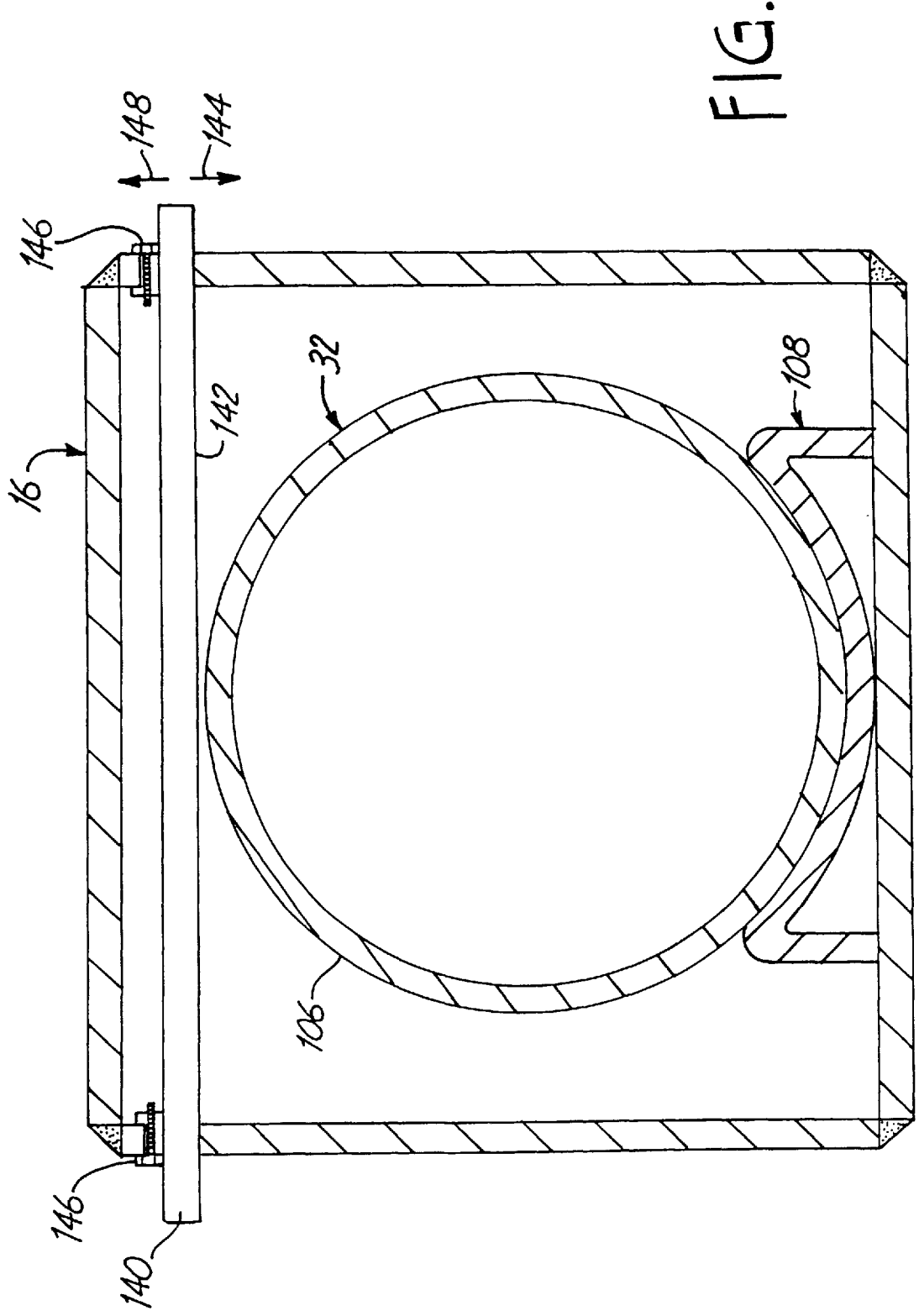
FIG. 5 is a cross-sectional view of an alternate embodiment of a boom section having an internally mounted pipe section.

An alternate embodiment for securing the pipe section 32 in place within the boom section 16 is shown in FIG. 5. The pipe section 32 is disposed on the support bracket 108 as described previously. To secure the pipe section 32 in place, a rigid bar 140 is extended transversely through the boom section 16. An inner face 142 of the bar 140 is disposed against the external wall 106 of the pipe section 32, by sliding the bar 140 in the direction of arrow 144. A bolt and nut fastener 146 (or other type fastener known in the art) is used to lock the bar 140 in place. Releasing the fastener 146, allows the bar 140 to be moved in the direction of arrow 148, and the pipe section 32 can be adjusted inside the boom section 16.

FIG. 5A shows a side view of the boom section using the bar 140 to secure the pipe section 32 (shown in dashed lines). The bar 140 is disposed through a slot 150 in steel plates 100 and 102. The bolt and nut 146 are disposed through the slot and tightened so that the bar 140 is locked in place.

Placing the pipeline 19 inside the boom sections 16 and securing them in place prevents damage caused by external objects striking the pipeline. Folding and clearance problems associated with articulating the boom sections are minimized. Additionally, the boom system 12 is stabilized by directing the concrete along the longitudinal axes of the boom sections 16. The pipeline acts to stiffen the boom sections along the longitudinal axis, while minimizing eccentric loading. Heavy bracketing is eliminated, decreasing the weight of each boom system. The result is an increase in the allowable length and performance of the boom system 12.

Although the present invention has been described with reference to preferred embodiments, workers skilled in the art will recognize that changes may be made in form and detail without departing from the spirit and scope of the invention.

What is claimed is:

1. An articulated boom system comprising:
   a base;
   a plurality of boom sections, including a first boom section pivotally connected to the base, a second boom section pivotally connected to the first boom section, and a third boom section pivotally connected to the second boom section;
   a plurality of rigid pipe sections for transporting liquids and semi-liquids wherein a first pipe section is secured to the first boom section, a second pipe section is secured to the second boom section, and a third pipe section is secured to the third boom section, and wherein at least one of the pipe sections is disposed within an interior of one of the plurality of boom sections; and
   a plurality of rigid transitional piping sections, each having a pivotal connection, wherein a first end of a first transitional piping section is connected to a second end of the first pipe section and a second end of the first transitional piping section is connected to a first end of the second pipe section, wherein a first end of a second transitional piping section is connected to a second end of the second pipe section and a second end of the second transitional piping section is connected to a first end of the third pipe section, and wherein the pivotal connection of the first transitional piping section is coaxially aligned with an axis of rotation of the first and second boom sections and the pivotal connection of the second transitional piping section is coaxially aligned with an axis of rotation of the second and third boom sections.

2. The articulated boom system of claim 1 and further comprising:
   a plurality of hydraulic actuators connected between the boom sections, including a first actuator connected between the first boom section and the second boom section and a second actuator connected between the second boom section and the third boom section.

3. The articulated boom system of claim 1 wherein at least one of the plurality of boom sections contains a bracketed interior defined by a bracket configured to accept one of the pipe sections, a face of the bracket having a radius of curvature approximately the same as an outer wall of the pipe sections.

4. The articulated boom system of claim 3 and further comprising a securing element for forcing the pipe section into engagement with the face of the bracket.

5. The articulated boom system of claim 4 wherein the securing element is a strap.

6. The articulated boom system of claim 4 wherein the securing element is a bar.

7. The articulated boom system of claim 1 wherein the plurality of pipe sections and the plurality of transitional piping sections are steel.

8. A placing boom comprising:
   first and second boom sections connected together in an articulated arrangement to pivot about an axis of rotation;
   first and second rigid pipe sections carried by the first and second boom sections, respectively, wherein at least one of the pipe sections is disposed inside one of the boom sections; and
   a plurality of rigid transitional piping sections connected between the first and second pipe sections and having a pivotal connection coaxially aligned with the axis of rotation of the boom sections.

9. The placing boom of claim 8 wherein at least one of the plurality of boom sections contains a bracketed interior defined by a bracket configured to accept one of the pipe sections, a face of the bracket having a radius of curvature approximately the same as an outer wall of the pipe sections.

10. The placing boom of claim 9 and further comprising a securing element for forcing the pipe section into engagement with the face of the bracket.

11. The placing boom of claim 10 wherein the securing element is a strap.

12. The placing boom of claim 10 wherein the securing element is a bar.

13. A concrete boom system comprising:
   a plurality of boom sections;
   a plurality of actuator assemblies interposed between adjacent boom sections for controlling relative angular positioning of the adjacent boom sections;
   a plurality of concrete pipe sections for transporting concrete from a first location to a second location, wherein each pipe section is carried by one of the plurality of boom sections and wherein at least one of the pipe sections is disposed inside one of the plurality of boom sections; and
   a plurality of rigid transitional piping sections, each transitional piping section located to connect the pipe sections carried by the adjacent boom sections and each transitional piping section having a rotation axis coaxially aligned with an axis of rotation of the adjacent boom sections.

14. The concrete boom system of claim 13 wherein at least one of the plurality of boom sections contains a bracketed interior defined by a bracket configured to accept one of the pipe sections, a face of the bracket having a radius of curvature approximately the same as an outer wall of the pipe sections.

15. The concrete boom system of claim 14 and further comprising a securing element for forcing the pipe section into engagement with the face of the bracket.

16. The concrete boom system of claim 15 wherein the securing element is a strap.

17. The concrete boom system of claim 15 wherein the securing element is a bar.

18. An articulated boom system comprising:
   a base;
   a plurality of boom sections, including a first boom section pivotally connected to the base, a second boom section pivotally connected to the first boom section, and a third boom section pivotally connected to the second boom section;
   a pipeline for transporting liquids and semi-liquids, wherein the pipeline is secured to the plurality of boom sections and wherein the pipeline is disposed within an interior of at least one of the plurality of boom sections;
   a bracketed interior defined by a bracket configured to accept the pipeline within at least one of the plurality of boom sections, a face of the bracket having a radius of curvature approximately the same as an outer wall of the pipeline; and
   a securing element for forcing the pipeline into engagement with the face of the bracket.

19. The articulated boom system of claim 18 and further comprising:
   a plurality of hydraulic actuators connected between the boom sections, including a first actuator connected between the first boom section and the second boom section and a second actuator connected between the second boom section and the third boom section.

20. The articulated boom system of claim 18 wherein the securing element is a strap.

21. The articulated boom system of claim 18 wherein the securing element is a bar.

22. A placing boom comprising:
   a plurality of boom sections connected together in an articulated arrangement;
   a pipeline carried by the boom sections, wherein the pipeline is disposed inside at least one of the boom sections;
   a bracketed interior defined by a bracket configured to accept the pipeline within at least one of the plurality of the boom sections, a face of the bracket having a radius of curvature approximately the same as an outer wall of the pipeline; and
   a securing element for forcing the pipeline into engagement with the face of the bracket.

23. The placing boom of claim 22 wherein the securing element is a strap.

24. The placing boom of claim 22 wherein the securing element is a bar.

25. A concrete boom system comprising:
   a plurality of boom sections;
   a plurality of actuator assemblies interposed between adjacent boom sections for controlling relative angular positioning of the adjacent boom sections;
   a concrete pipeline for transporting concrete from a first location to a second location, the concrete pipeline attached to the plurality of boom sections, wherein the concrete pipeline is disposed inside at least one of the plurality of boom sections;
   a bracketed interior defined by a bracket configured to accept the pipeline within at least one of the plurality of boom sections, a face of the bracket having a radius of curvature approximately the same as an outer wall of the pipeline; and
   a securing element for forcing the pipeline into engagement with the face of the bracket.

26. The concrete boom system of claim 25 wherein the securing element is a strap.

27. The concrete boom system of claim 25 wherein the securing element is a bar.

28. A placing boom comprising:
   first and second boom sections connected together in an articulated arrangement to pivot about an axis of rotation, wherein at least one of the boom sections is made of composite material;
   first and second steel pipe sections carried by the first and second boom sections, respectively, wherein one of the pipe sections is disposed inside the boom section made of composite material; and
   a plurality of steel transitional piping sections connected between the first and second pipe sections and having a pivotal connection coaxially aligned with the axis of rotation of the first and second boom sections.

* * * * *